United States Patent [19]

Rees

[11] Patent Number: 5,338,100
[45] Date of Patent: Aug. 16, 1994

[54] HIGH STRENGTH AUTOMOTIVE SEAT FRAME AND METHOD

[75] Inventor: Richard W. A. Rees, Rochester, Mich.

[73] Assignee: ITT Corporation, New York, N.Y.

[21] Appl. No.: 840,774

[22] Filed: Feb. 24, 1992

[51] Int. Cl.$^5$ ............................................. A47C 7/00
[52] U.S. Cl. ................................................. 297/452.1
[58] Field of Search ............... 297/452, 379, 483, 484, 297/355

[56] References Cited

U.S. PATENT DOCUMENTS

| | | |
|---|---|---|
| 1,684,062 | 9/1928 | Leach . |
| 2,720,914 | 10/1955 | Doty et al. . |
| 2,783,826 | 3/1957 | Haltenberger . |
| 2,915,111 | 12/1959 | Homier . |
| 2,924,265 | 2/1960 | Himka . |
| 3,259,435 | 7/1966 | Jordan, Jr. . |
| 3,398,987 | 8/1968 | Lynn et al. ............... 297/379 |
| 3,433,524 | 3/1969 | Close ............... 297/379 X |
| 3,471,197 | 10/1969 | Ely . |
| 3,638,999 | 2/1972 | Tischler ............... 297/379 |
| 3,736,026 | 5/1973 | Ziegler et al. ............... 297/379 |
| 4,015,812 | 4/1977 | Heesch . |
| 4,432,583 | 2/1984 | Russo . |
| 4,492,408 | 1/1985 | Lohr ............... 297/452 X |
| 4,544,204 | 10/1985 | Schmale ............... 297/452 |
| 4,625,537 | 12/1986 | Aleck . |
| 4,822,100 | 4/1989 | Bell . |
| 4,832,409 | 5/1989 | Borlinghaus . |
| 4,875,735 | 10/1989 | Moyer . |
| 4,880,274 | 11/1989 | Ichikawa . |
| 4,929,024 | 5/1990 | Secord . |
| 4,943,116 | 7/1990 | Ohwada . |
| 4,962,963 | 10/1990 | Robinson . |
| 4,969,682 | 11/1990 | Gray . |
| 4,986,514 | 1/1991 | Ikegaya . |
| 5,002,339 | 3/1991 | Yamashita . |
| 5,028,091 | 7/1991 | Zaveri . |
| 5,050,932 | 9/1991 | Pipon et al. ............... 297/452 X |
| 5,052,752 | 10/1991 | Robinson . |

FOREIGN PATENT DOCUMENTS

| | | |
|---|---|---|
| 0160927 | 11/1985 | European Pat. Off. . |
| 0236146 | 9/1987 | European Pat. Off. . |
| 1024816 | 2/1958 | Fed. Rep. of Germany . |
| 2602022 | 7/1977 | Fed. Rep. of Germany ...... 297/483 |
| 1569823 | 6/1969 | France . |
| 1233054 | 5/1971 | United Kingdom . |
| 2235620 | 3/1991 | United Kingdom . |

*Primary Examiner*—James R. Brittain
*Attorney, Agent, or Firm*—Robert P. Seitter; J. Gordon Lewis

[57] ABSTRACT

A motor vehicle seat recliner includes an upper member (34) which is supportive of a seat back (22) and a lower member (36) which is supportive of a seat cushion (21) and is carried for longitudinal adjustment within a host vehicle. An adjuster (40) is operative to establish a substantially fixed angular position between the members, the adjuster including a longitudinally disposed drive screw (62) which is restrained from axial displacement in one direction by an abutment surface (56) which is defined by a thrust plate (46) carried by the lower member and a link (130) which is pivotally interconnected to the screw by a traveling member (126) and is also pivotally interconnected to the upper member by a parallel arrangement of a link control bracket (144) and a displaceable lock plate (154), whereby frontal impact imposed moment arm forces will subject the link and screw to substantially pure compressive loading.

23 Claims, 7 Drawing Sheets

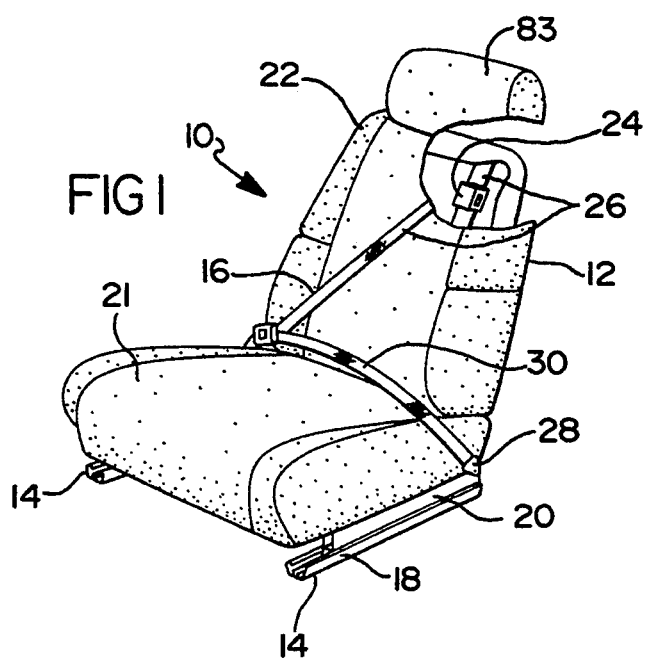
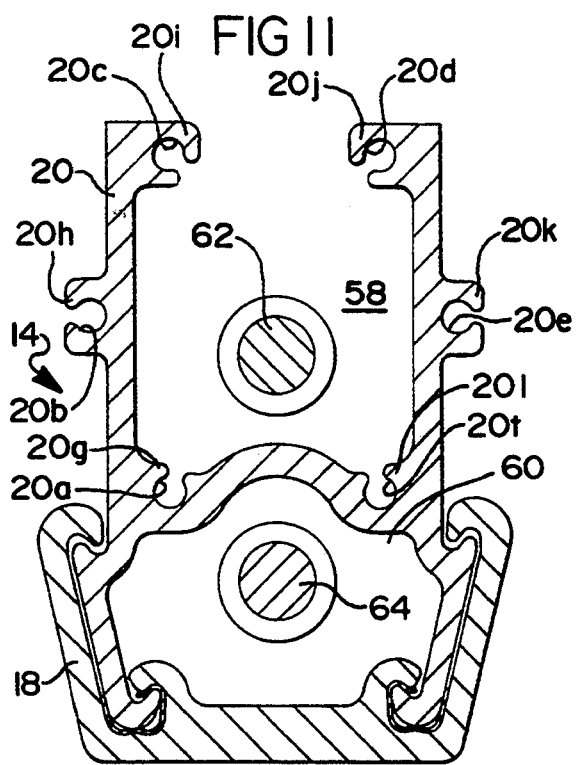
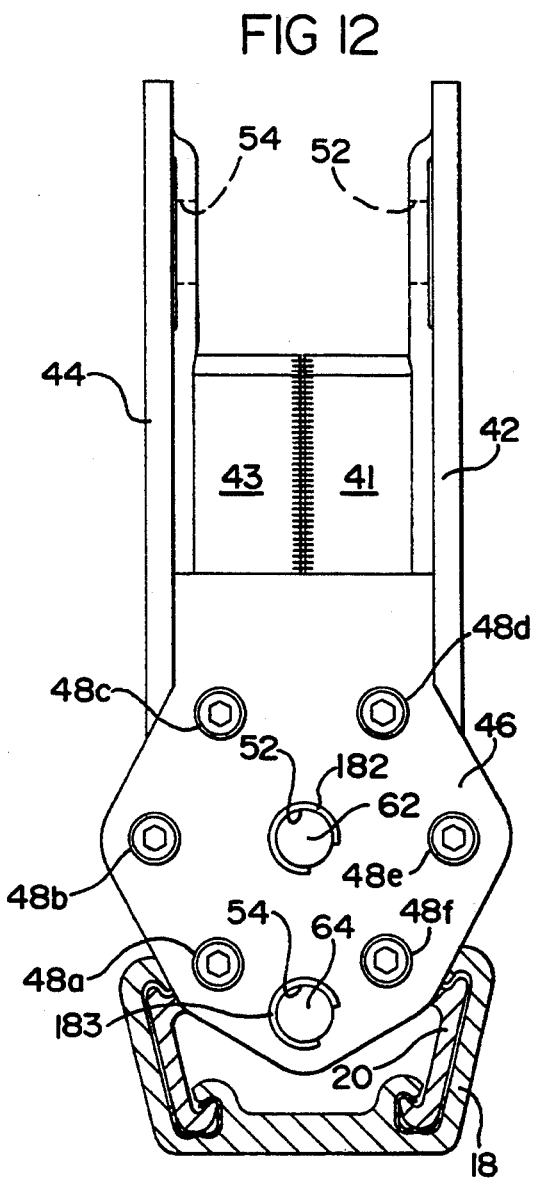

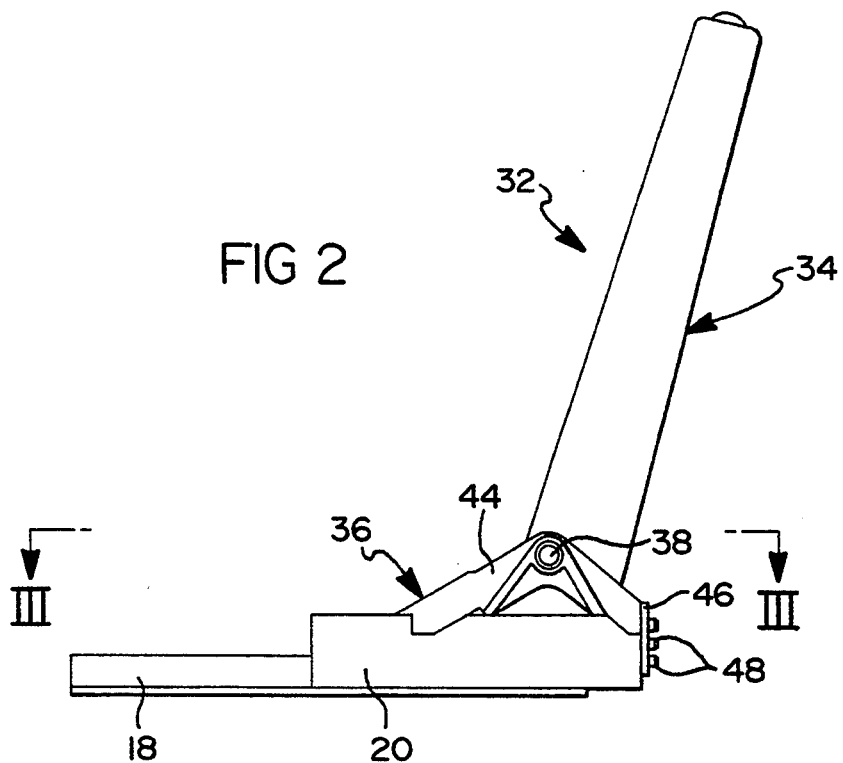
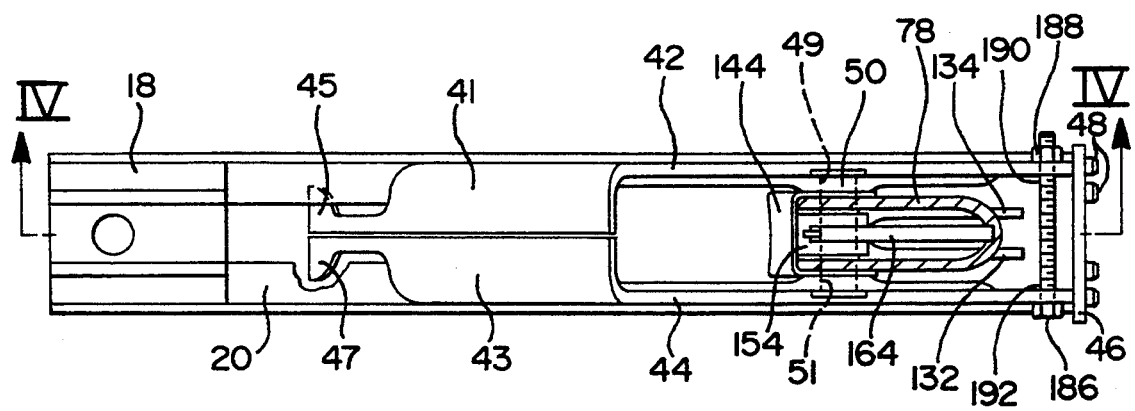

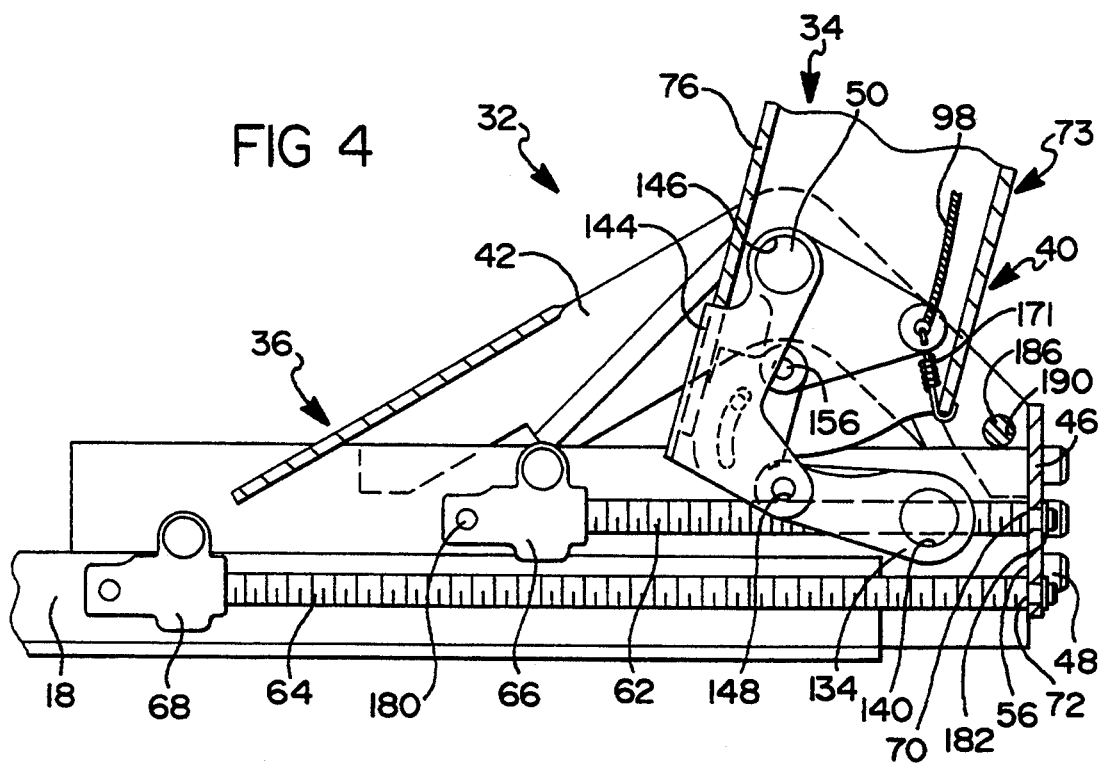
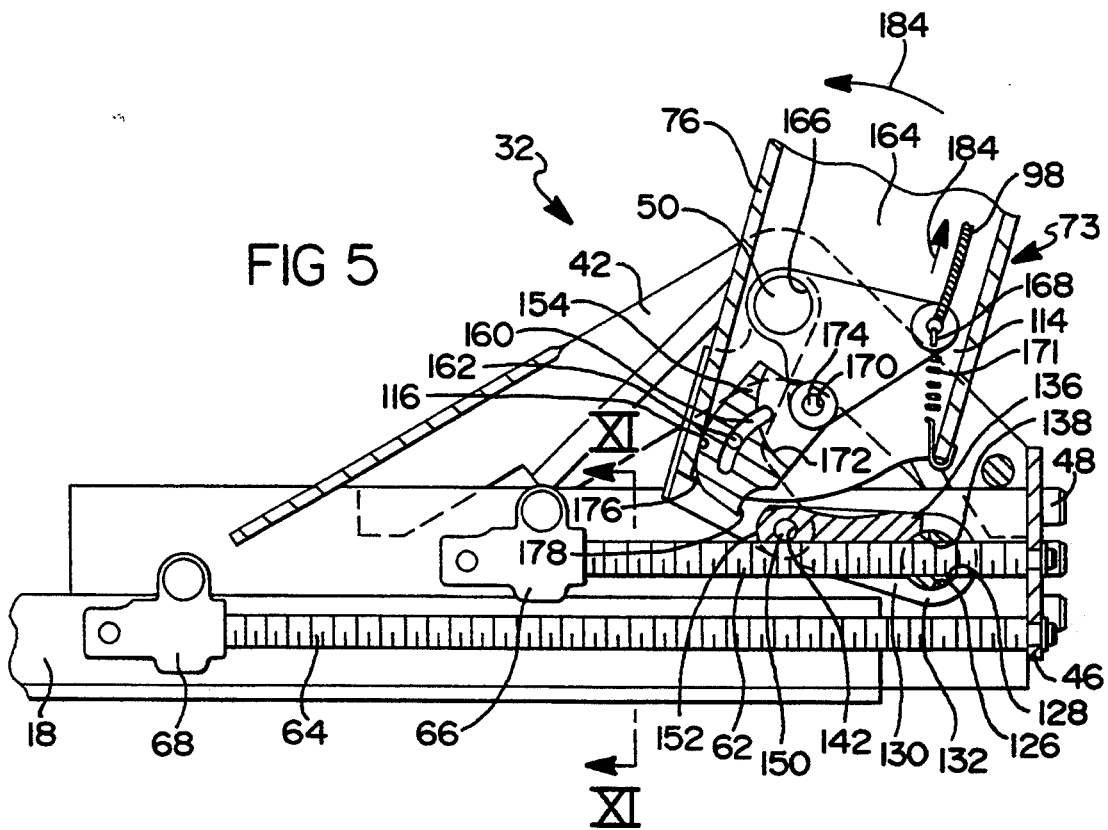

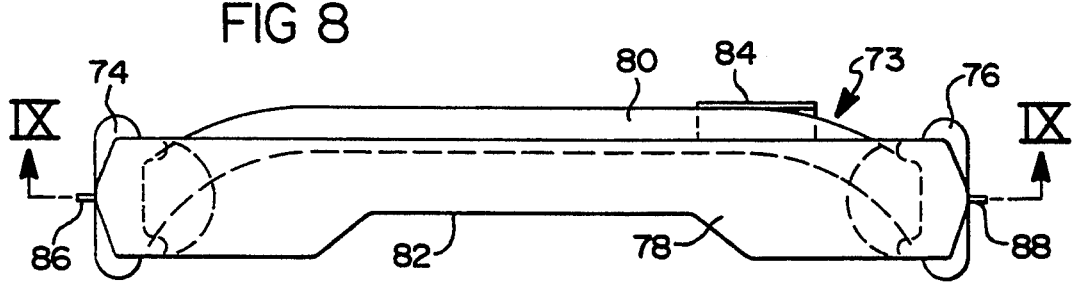
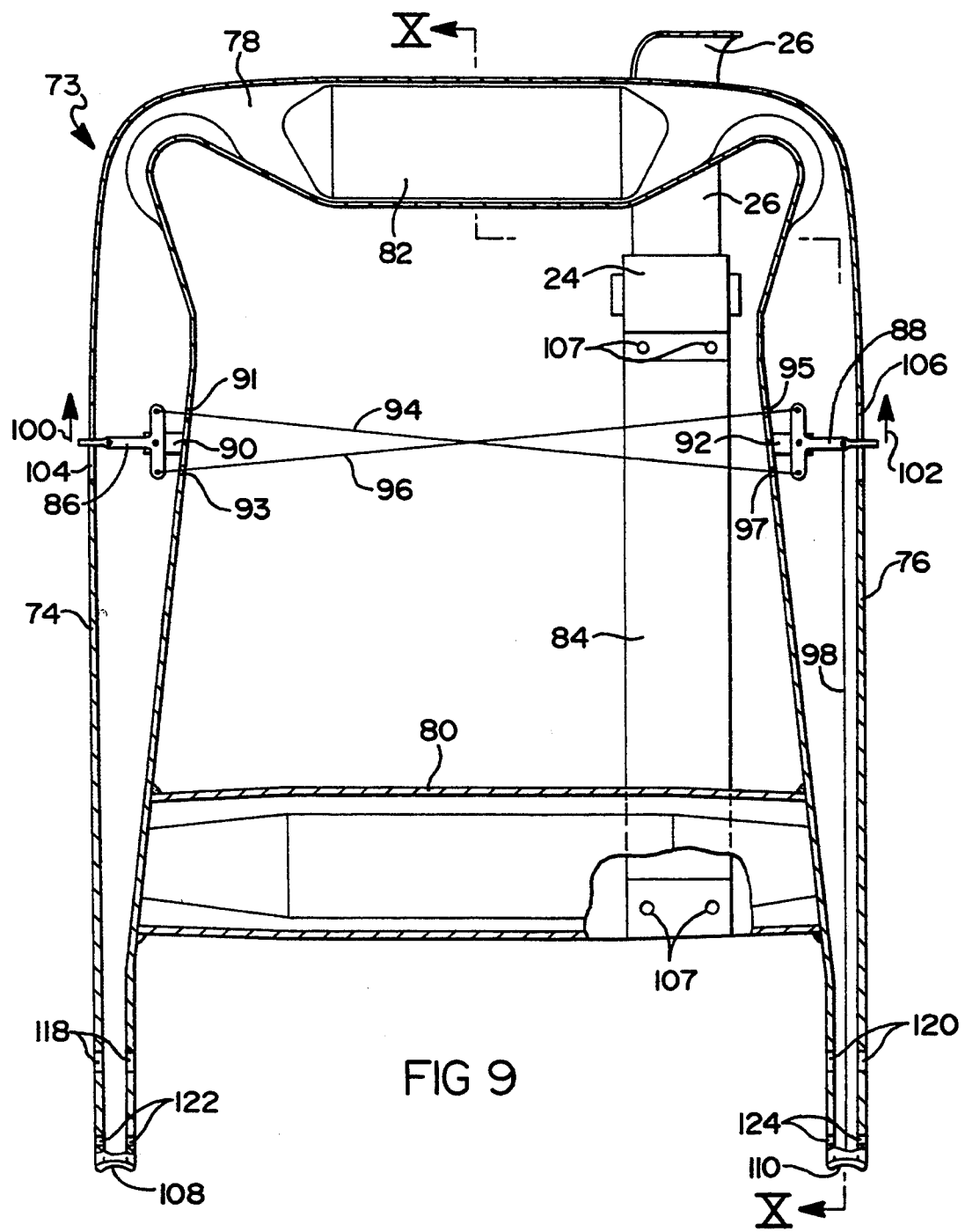

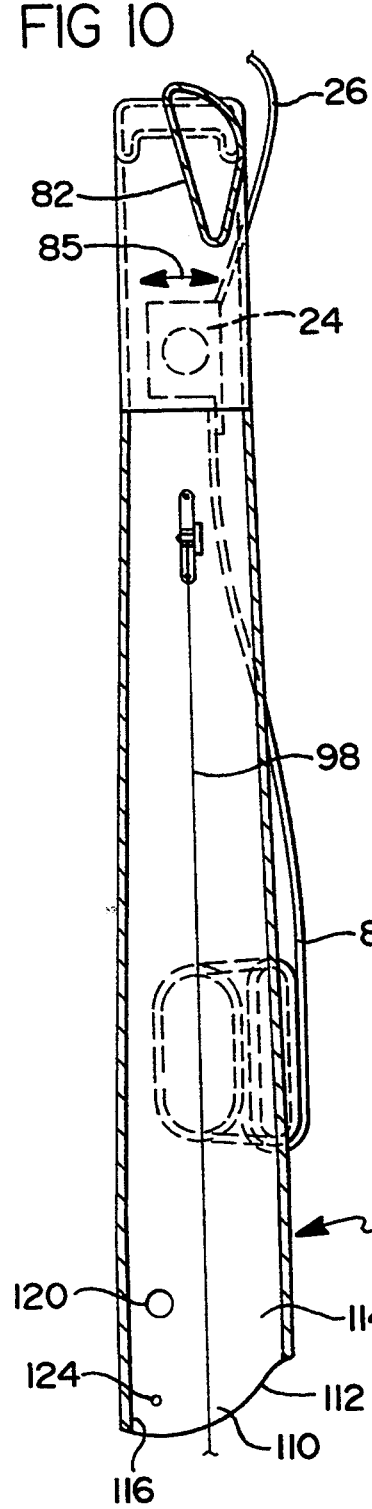
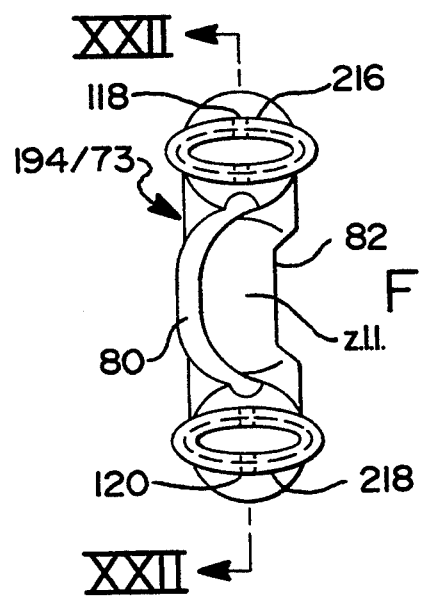
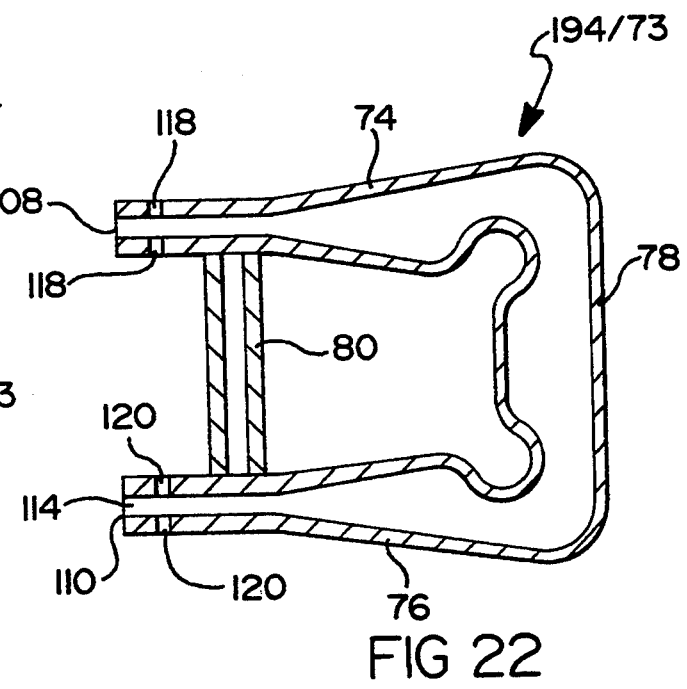

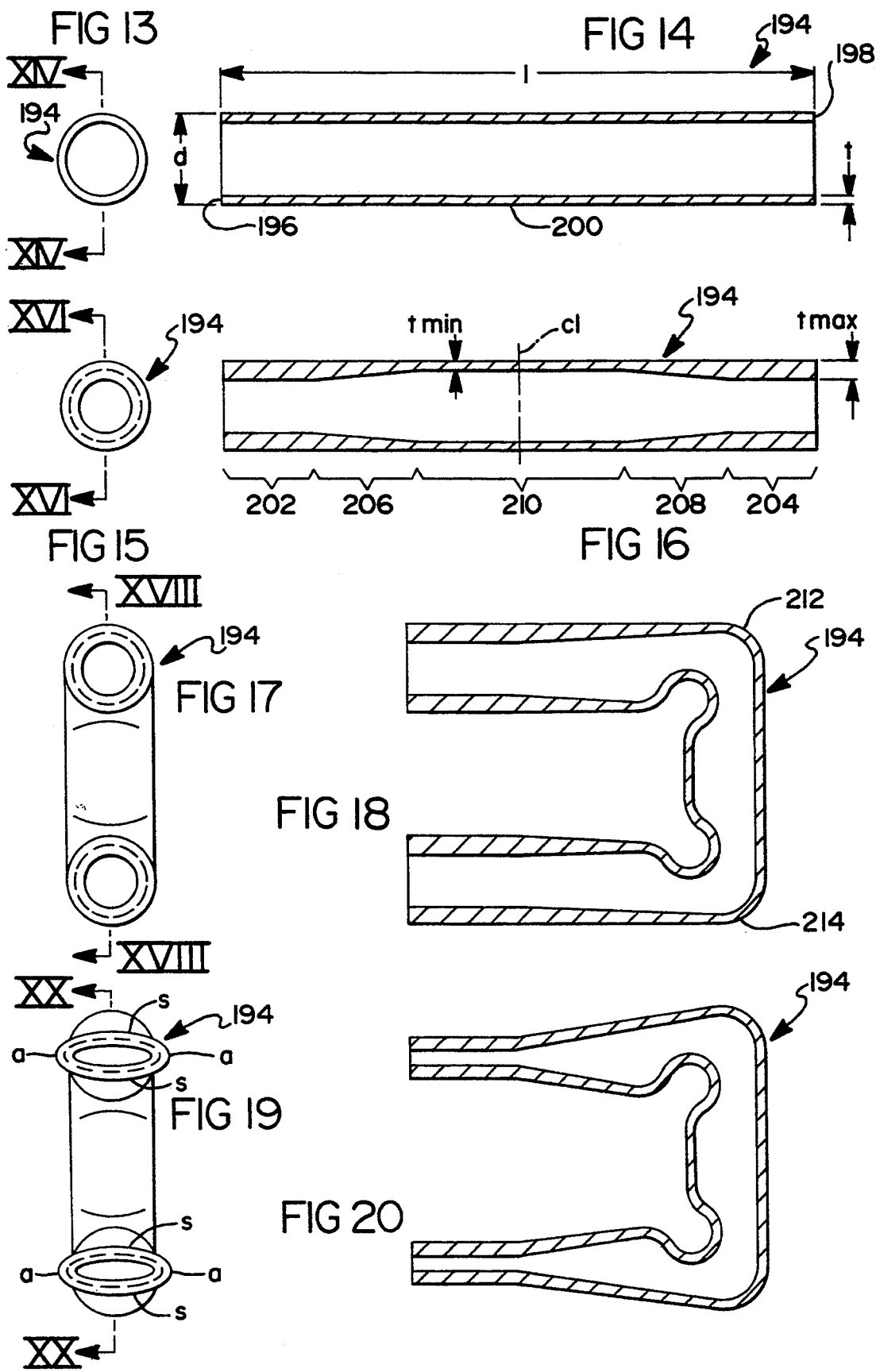

HIGH STRENGTH AUTOMOTIVE SEAT FRAME AND METHOD

INTRODUCTION

The present invention relates to automotive vehicle seat systems and, more particularly, to lightweight, high strength, economical frames and recliners employed in such systems.

CROSS-REFERENCE

The present invention relates to the inventions of U.S. Ser. No. 07/808,503 filed Dec. 17, 1991 entitled "Extruded Automotive Seat Track" now U.S. Pat. No. 5,213,300, as well as an application entitled "High Strength Motor Vehicle Seat Recliner", U.S. Ser. No. 07/840,373, filed Feb. 24, 1992.

BACKGROUND OF THE INVENTION

Automotive seating systems are typically designed as part of a host vehicle occupant's protection or safety system. Accordingly, various requirements are imposed on such seating systems. They must have high strength and structural integrity so that the seat remains anchored to the vehicle in the event of a crash, i.e., the seat tracks should not separate from the vehicle, from each other or from the seat. Furthermore, the seat back should either remain in its pre-crash set position, or under certain conditions collapse in a predictable, energy absorbing manner. Test results embodied in U.S. Federal Motor Vehicle Safety Standards 208 and 210 require that the seat belts and their anchorages withstand loads of 1500 to 3000 pounds without failure. If any anchorage is mounted to the seat structure, the structure must withstand such loads as well. The outboard (adjacent the door) upper and lower seat belts and anchorages should withstand the load of 1500 pounds and the inboard (adjacent the center line) lower part should withstand 3000 pounds. In addition, increased emphasis on fuel economy necessitates vehicle weight reduction. This, of course, makes it highly desirable to reduce the weight of the seating system, but mere weight reduction can adversely impact the strength of the seating system.

Cost containment is still another requirement imposed upon automotive vehicle seating systems and prior art attempts to meet all three requirements, high strength—lightweight—low cost, have not been satisfactory. Some attempts have been made to substitute aluminum for steel in the design of seat frame assemblies. These designs typically required steel reinforcements to provide the necessary structural strength and such reinforcements add weight, package size and cost to the systems.

Another desirable advantage of automotive seating systems is the integration of the seat restraints or safety belt means so that the track assemblies, seat and seat belts are a self-contained unit. If the seat belts were integrated with seat and track assemblies, adjustment of the seat by the occupant would not require readjustment of the seat belts. It would also facilitate the installation of the seat belts in convertible vehicles where no pillars are readily available. Usually the seat belts are anchored to the vehicle body pillar and floor to reduce the loads imposed on the seat track assemblies during a crash. Attempts to integrate all of the seat belts with the seat and track assemblies aggravate the strength and weight considerations noted above.

The use of seat back recliner mechanisms further aggravate the shortcomings of prior art designs in that they tend to have an operating range of motion which are limited to fifty degrees or less. Furthermore, they are configured to provide the lowest mechanical advantage when the seat back is in a full down or reclined position wherein an extremely large motor and drive train is required to lift an occupant and seat back to the upright position. A dump feature, necessary to permit entry into the back seat of a two door vehicle, has proven difficult to provide in seating systems which include seat back reclining mechanisms. When such dump features are provided to permit momentary disconnection between the seat back adjuster and the seat back, "chucking" i.e., a slight movement of the seat frame and seat back and looseness in construction evident in an unoccupied seat, presents a further problem.

Finally, in so-called fully structural seats in which all three seat belt anchorage points are born by the seat frame, designs with enhanced strength are required. However, limited passenger compartment space has made the packaging of the foregoing features difficult. A related problem results from the necessity of having a seat frame design which is extremely rigid, particularly when subjected to frontal impact forces, while collapsing in a controlled, predictable and energy absorbing manner upon severe rear impact conditions.

BRIEF DESCRIPTION OF THE INVENTION

Accordingly, is an object of the present invention to provide a seat back frame which can be used for fully structural seat applications, which is lightweight and overcomes the shortcomings of the prior art described hereinabove. In the broadest sense, such a seat would include a back frame having tubular inboard and outboard vertical leg members and a tubular horizontal base member which integrally interconnects the upper portions of the leg members in a generally inverted U-shaped configuration. The leg members extend downwardly from the base member and terminate in open ended portions adapted for interconnection with an associated seat cushion frame, the base member and upper portions of the leg members having a characteristic minimum wall thickness and lower portions of the leg members having a characteristic maximum wall thickness which tapers upwardly therealong to said minimum wall thickness. This arrangement provides the advantage of a lightweight extremely strong and inexpensive seat back frame design.

In the preferred embodiment of the invention, the seat back frame is formed from a single piece of metal tube having open ends and a substantially constant diameter and wall thickness therealong. In the inventive method of forming the seat back frame, the metal tube is mechanically worked to effect localized changes in the wall thickness to taper from a maximum dimension adjacent at least one of the ends to a lesser dimension located intermediate the ends. Next, the tube is bent in at least two locations of lesser wall thickness to form a substantially U-shaped frame configuration. Finally, the tube ends are deformed into flat-sided ellipsoid sections having maximum dimension axes which are substantially parallel. This arrangement provides for cost effective manufacturing of the seat back frame resulting in a configuration which is easily adapted for mounting to the seat cushion frame.

According to one aspect of the invention, the upper portions of the seat back frame vertical leg members have a substantially circular cross-section and the lower portions are characterized by flat-sided ellipsoid cross-sections. This arrangement has the advantage of providing the seat back frame with a substantially A-frame configuration which greatly enhances strength without adding weight or cost.

In the preferred embodiment of the invention, the seat back frame is employed within a vehicle seat assembly including at least two laterally spaced, longitudinally extending lower seat tracks which are adapted to be rigidly affixed to the floor pan of a host motor vehicle, an upper seat track carried by each of the lower seat tracks for controlled longitudinal displacement with respect thereto, the upper seat tracks adapted for supporting a seat pan and cushion. A seat back frame adapted for supporting a seat back rest is hinged to the two tracks about a common axis. Lastly, an adjuster mechanism carried by one or both of the upper seat tracks engages the seat back frame and operates to select and substantially fix the position of the seat back frame within a range between an upright position and a rearwardly reclined position. The mechanism includes a longitudinally disposed drive screw which is restrained from rearward displacement with respect to the upper seat track by a substantially vertically disposed thrust plate carried on a rearmost end of the upper track. A traveling nut threadably engaged upon the drive screw is pivotally linked to one end of a rigid elongated link member. The other end of the link member is pivotally connected to the seat back frame through an intermediate control bracket, whereby the link is disposed in a generally parallel relationship with the drive screw when the seat back frame is near its upright position to affect substantially compressive loading upon the link and a portion of the drive screw intermediate the nut and the thrust plate. Furthermore, the link is disposed generally at right angles to the drive screw when the seat back frame is near its rearwardly reclined position to provide a near maximum mechanical advantage upon activation of the adjuster mechanism. This arrangement provides a compact highly efficient seat and seat recliner assembly.

According to another aspect of the invention, the seat recliner includes a latch which is operable to disengage the adjuster mechanism from the upper recliner structure. This enables manual free forward rotation or dumping of the upper recliner structure beyond a forward limit of travel established by the adjuster mechanism. This arrangement allows application of the present invention to two-door vehicles.

According to another aspect of the invention, the latch means includes a lock plate which is slidingly displaceable between an engaged position which is abuttingly intermediate the upper recliner structure and the link and a release position in which the recliner structure is displaceable in one direction with respect to the link. This arrangement has the advantage of employing a latch which serves as a dead-bolt and is subjected to purely compressive loading, providing an extremely strong yet lightweight design.

According to still another aspect of the invention, the lock plate defines a first generally convex surface which is disposed in a tangentially abutting relationship with a mating surface defined by the upper recliner structure and a second, opposed generally concave surface embracingly abutting the link when the lock plate is in the engaged position. The end of the link is complimentarily shaped to the concave surface to permit limited sliding engagement therebetween. The first and second surfaces are converging to effect wedging engagement with the upper recliner structure mating surface and the link as the lock plate transitions from the release position towards the engaged position to substantially reduce or eliminate chucking therebetween.

According to a final aspect of the invention, the upper recliner structure includes a seat back frame which is interconnected to the lower recliner structure by a hinge pin and a link control bracket which is pivotally connected to the seat back frame at one end and pivotally interconnected to the opposite end of the link by a pivot pin. This arrangement provides the advantage of positioning the link so as to ensure compressive loading during impact while, simultaneously, permitting dumping of the seat back.

These and other features and advantages of this invention will become apparent upon reading the following specification, which, along with the drawings, describes and discloses a preferred embodiment of the invention in detail.

A detailed description of the disclosed embodiment makes reference to the accompanying drawings.

BRIEF DESCRIPTION OF THE DRAWINGS

FIG. 1, is a perspective, partially cut away view of an automotive seating system including a fully integrated seat, seat track assembly and seat belt system;

FIG. 2, is a side view of a high strength seat frame from the seat of FIG. 1;

FIG. 3, is a top, cross-section view on an enlarged scale of the seat frame assembly taken on lines III—III of FIG. 2;

FIG. 4, is a cross-section view taken on lines VI—VI of FIG. 3 on an enlarged scale with the latch lock plate in the engaged position;

FIG. 5, is the cross-section in partial relief of FIG. 4 but with the lock plate moved toward the release position;

FIG. 8, is a top plan view of the seat back frame of the present invention;

FIG. 9, is a front cross-section view taken on the lines IX—IX of FIG. 8;

FIG. 10, is a side, broken cross-section view taken on lines X—X of FIG. 9;

FIG. 11, is a cross-section view of the track assembly taken on lines XI—XI of FIG. 5 on an enlarged scale;

FIG. 12, is a rear view of the lower recliner structure on an enlarged scale; and FIGS. 13–22, illustrate various steps in forming the seat back frame.

DETAILED DESCRIPTION OF THE PREFERRED EMBODIMENT

Figure 6:
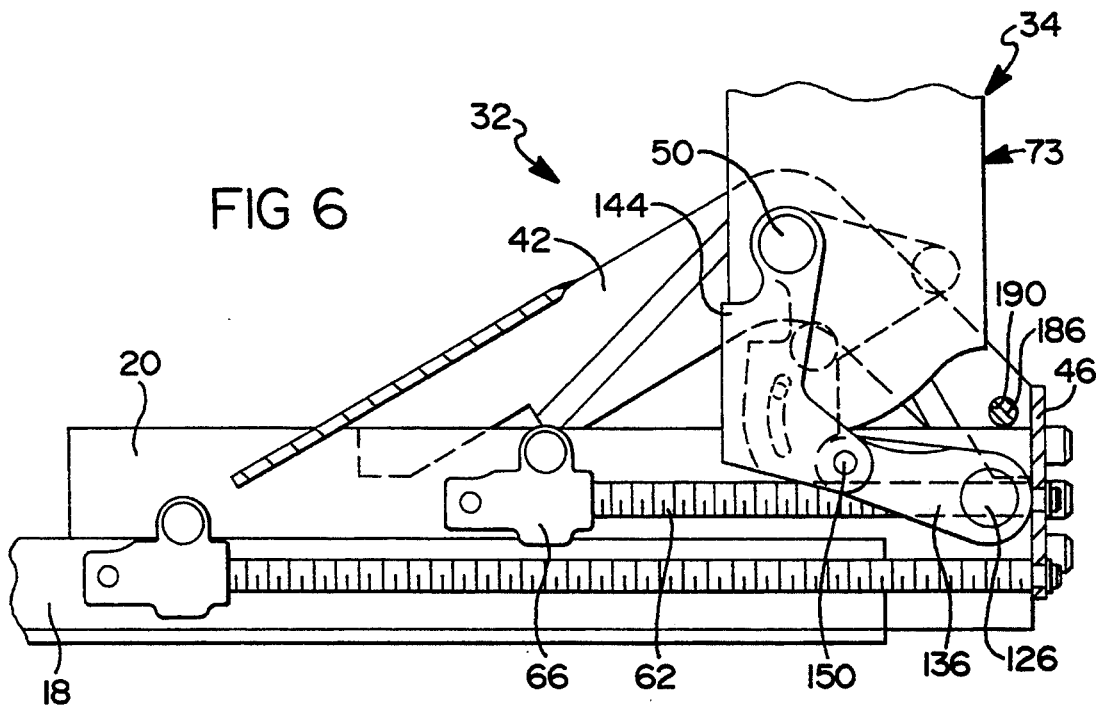
FIG. 6, is the cross-section in partial relief of FIG. 4 with the seat back frame adjusted to its full upright position.

Referring to FIG. 1, an integrated automotive seating system 10 includes an automotive seat 12, a pair of seat track assemblies 14 and a seat belt system 16. Each track assembly 14 includes a lower track member 18 adapted for use with conventional fasteners to secure it to the floor of an associated host vehicle and also includes an upper track member 20 adapted for use with conventional fasteners to secure it to the bottom of the seat 12. The track members are elongated extrusions made of lightweight, high strength material such as an aluminum alloy and are formed so that they are slideably engaged with each other for longitudinal movement of the upper track member and seat relative to the fixed lower track member. A conventional coupling arrangement is associated with each upper track member 20 to assure that they move in unison. Accordingly, the position of the seat is adjustable longitudinally in the vehicle.

Although not shown in the drawing, each seat track assembly is also associated with locking means to lock the upper seat track member in an adjusted position. If seat adjustment is accomplished manually, any conventional such locking means can be used. Preferably, the seat track assemblies are associated with an electric motor and drive means to drive the upper seat track 20 for adjusting its position. Any conventional motor and drive means can be utilized and as usually in such arrangements, the locking means is part of the motor and drive means.

The automotive seat 12 includes a lightweight high strength frame 32. It also includes a bottom cushion 21 and back rest 22. Embedded with the top of back rest 22 is an anchor member 24 which holds a shoulder belt 26 of the seat belt system 16. The track assemblies 14 also each includes an anchor member 28 and each anchor member holds a portion of a lap belt 30. All cooperate in a conventional manner to hold the occupant in the seat 12 in the event of a crash. For the sake of simplicity, structural details of the seat pan, cross braces and vertical and longitudinal seat adjuster mechanisms are deleted. Typical prior designs can be found, by way of example, in U.S. Pat. Nos. 4,432,583 and 4,015,812.

Referring to FIG. 11, the construction of track assemblies 14 is shown in greater detail. Each track assembly 14 is essentially the same and, accordingly, only one need to be shown and described. For further detail, the reader is referred to the applicant's co-pending application U.S. Ser. No. 07/808,503 filed Dec. 17, 1991 for "Extruded Aluminum Seat Track," the specification of which is hereby incorporated herein by reference.

Referring to FIGS. 2 through 5, the structural detail of seat frame 32 is illustrated which includes an upper member or recliner structure shown generally at 34 and a lower member/recliner structure generally at 36 joined at a pivot or hinge point 38. All major structural elements are formed of high strength aluminum alloy.

Lower recliner structure 38 comprises upper and lower track members 18, 20, inner and outer recliner pivot supports 42, 44, respectively, and a thrust plate 46. Upper track member 20, pivot supports 42 and 44 as well as thrust plate 46 are constructed as a single rigid integrated assembly such as by welding and/or threaded fasteners 48. In the preferred embodiment, welding is avoided or minimized, especially on the track members due to its tendency to metalurgically weaken the material. Thrust plate 46 and pivot supports 42, 44 can be formed from a single piece of material and configured in a generally U-shape (as viewed from above). As illustrated, pivot supports 42, 44 are formed separately and include inwardly turned flanges 41 and 43 which are butt welded and define laterally extending goblet-shaped extensions 45 and 47 which, in assembly, are captured within an upwardly opening channel 58 formed by the upper track member 20 to help prevent release thereof. The uppermost portions of pivot supports 42, 44 form registering apertures 49, 51, respectively, for receiving a large steel pivot pin 50 which is held in assembly by deformation, fasteners or other suitable means.

As best viewed in FIGS. 2, 3 and 12, thrust plate 46 is formed of extremely heavy gauge material and is rigidly mounted to prevent separation from the upper track member under high loading conditions by six hardened bolts 48a–f extending through an array of bores 53a–f and threadably engaging corresponding longitudinally extending passageways 20a–f defined by bosses 20a–l integrally extruded in upper track member 20. Plate 46 has two laterally centered through bores 52, 54 formed therein. The surface portion of plate 46 defining bores 52 and 54 facing forwardly in application toward the front of the host vehicle (leftwardly as viewed in FIGS. 2 through 7), is deemed a thrust surface 56.

As best seen in FIG. 11, upper track member 20 is generally H-shaped in the cross-section, defining upwardly and downwardly opening longitudinally extending channels 58 and 60, respectively. Drive screws 62 and 64 are disposed within channels 58 and 60, respectively, and are each individually driven by a motor/gear transmission 66, 68, respectively, carried by upper track member 20 in the usual manner. Motor/gear transmissions 66, 68 are selectively energized by the vehicle operator via a power control circuit (not illustrated) to effect reclining of seat back 34 and the longitudinal positioning of seat 12, respectively. The rearward most (rightward) ends of drive screws 62, 64, have steps 70, 72 formed therein rightwardly abutting thrust surface 56 and extending through bores 52, 54, respectively. C-clips 182, 183 or other suitable fasteners are applied in radially outwardly opening circumferential grooves to axially restrain drive screws 62 and 64 from leftward displacement. Thus, drive screws 62 and 64 are carried for displacement with upper track member 20 but are selectively rotatable in response to an operator input. Drive screw 64 carries a traveling nut (not illustrated) which is interconnected with lower track member 18 through linkage as is well known in the art to effect longitudinal adjustment of seat 12.

Upper structure 34 constitutes a seat back frame 73 made from an inverted, generally U-shaped tube formed of high strength material such as aluminum alloy. The U-shaped portion of the upper structure is formed from a single piece of aluminum tube that is either extruded with a varying wall thickness or, preferably, double-butted (rolling and working) a constant diameter and constant wall thickness tube to produce a variable thickness wall. In either event, the resulting tube form varies in wall thickness from a maximum of approximately 4.5 millimeters to a minimum of 2.5 millimeters. As viewed in FIGS. 8 through 10, the seat back frame 73 comprises inboard and outboard vertically extending leg members 74 and 76, interconnected by a generally horizontal base member 78. A laterally disposed reinforcement member 80 bridges the free ends of leg members 74 and 76 to provide structural integrity and is affixed thereto by welding or other suitable fastening means. The portion of leg members 74 and 76 below reinforcement member 80 are of relatively thick constant wall section to enhance strength at the point of mounting upon lower structure 36 while the section of the tubing above reinforcement member 80 tapers down to a thinner gage to reduce overall weight and lower the center of gravity of the assembly. The central portion of base member 78 has a flattened portion 82 to facilitate mounting of a headrest 83 (FIG. 1) in the final trimmed seat assembly. The upper portions of leg member 74 and 76 are generally circular in cross-section and transition into a flat sided oval shape at the lowermost end thereof as best seen FIGS. 3 and 8. Reinforcement member 80 is curved to accommodate contours of the occupant's back for comfort and is attached to leg members 74 and 76 at their neutral stress axis.

A vertically elongated aluminum strap brace 84 is rigidly fastened at the lower end thereof to reinforcement member 80 and, at the upper end thereof supports anchor member 24. Strap brace 84 is secured to anchor member 24 and reinforcement member 80 by blind rivets 107 or other suitable fasteners. Shoulder belt 26 extends from anchor member 24 behind base member 78 and over the occupant's shoulder. Thus, frontal impact induced forces will place strap brace 84 in pure tension. As a result, relatively thin material can be employed allowing anchor member 24 to longitudinally float within the back rest 22 padding as indicated by arrow 85 to facilitate occupant comfort.

Opposed seat back dump handles 86 and 88 are pivotally mounted to brackets 90 and 92, respectively, carried within the upper part of leg members 74 and 76, respectively, of seat back frame 73. The handles 86 and 88 are interconnected by wires 94 and 96 and extend laterally in opposite directions to provide occupant access from either side of seat 12. Guide wires 94 and 96 pass through guide holes 91 and 97, and 93 and 95, respectively, formed in leg members 74 and 76. A control wire 98 extends from handle 88 to the open bottom end of leg member 76 to affect dumping of seat back frame 73 upon lifting of the exposed portion of either handle 86 or 88, as indicated by arrows 100 and 102. Handles 86 and 88 extend through vertical slots 104 and 106 in the wall of leg members 74 and 76, respectively. For the sake of simplicity, seat system 20 is described herein as including a power seat back recliner only on the outboard portion thereof. As will be described in detail hereinbelow, control wire 98 is operatively connected with said recliner. It is contemplated that if required, dual recliners can be employed. In such case, a second control wire (not illustrated) would be interconnected from handle 86 to the inboard recliner mechanism within leg member 74.

An important aspect of the design of seat back frame 73 stems from its A-shaped profile transitioning from a small longitudinal dimension (approximately 6.4 cm) near its top to a greater dimension (approximately 8.7 cm) adjacent the bottom ends of leg members 74 and 76. This feature is believed to substantially increase the overall structural integrity of frame 73 without adding significant cost or weight thereto, and also provides greater room between the sides of the seat back frame for the occupant.

The bottom ends of leg members 74 and 76 form openings 108 and 110 and define a vertically tapered (from front to rear) end surface 112 to provide clearance for the seat back hinge and recliner mechanism. Openings 108 and 110 provide access to a cavity 114 within frame 73. The inner surface of the longitudinally forward most wall portion of leg members 74 and 76 define an abutment surface 116 adjacent each opening 108 and 110. Large, registering lateral through bores 118 and 120 are formed near openings 108 and 110, respectively. A second pair of smaller, laterally extending registering through bores 122 and 124 are formed slightly beneath bores 118 and 120.

Referring to FIGS. 4 through 7, the structural details and operation of seat recliner/back adjuster 40 is illustrated. Back frame 73 is pivotally mounted to pivot supports 42 and 44 by pivot pin 50 which extends through registering bores 52, 54 and 120 (118) and is secured in assembly as best illustrated in FIG. 3 and described hereinabove. As mounted, seat back frame 73 is rigidity restrained in assembly with lower recliner structure 36 and is permitted only a limited degree of relative rotation therebetween. A solid cylindrical traveling nut 126 has a threaded through bore 128 engaged upon drive screw 62 for fore and aft longitudinal translation therealong. A generally U-shaped elongated link 130 has laterally spaced inner and outer legs 132 and 134, respectively integrally interconnected by a base 136. Legs 132 and 134 laterally straddle drive screw 62. Registering through bores 138 and 140 are formed adjacent one end of legs 132 and 134, respectively, and establish a slip-fit with the lateral ends of traveling nut 126 whereby the end of nut 126 associated with bores 138 and 140 is free for relative rotation with respect to nut 126 but is longitudinally drivingly positioned thereby. A smaller diameter bore 142 extends laterally through an opposite end of link 130. A link control bracket 144 is generally U-shaped to embrace the lowermost leading outer-surface of leg member 76. Bracket 144 has a pair of large bores 146 formed therein which register with bores 120 of leg member 76 and receive pivot pin 50 therethrough. As best viewed in FIG. 4, bracket 144 extends downwardly from its point of pivotal attachment to seat back frame 73 wherein upon clockwise rotation of seat back frame 73 from its illustrated position, bracket 144 will tend to be carried therewith. Conversely, upon counterclockwise rotation of seat back frame 73 from its illustrated position in FIG. 4, bracket 144 will tend to remain in its illustrated position. The lowermost portion of bracket 144 has a set of registering bores 148 formed therein which are positioned in alignment with bore 142 of link 130 and joined therewith by a connecting pin 150, such as a hardened steel roll pin, to establish a pivot joint. The left-hand most surface of the end of link 136 associated with bore 142 is generally convex and forms an abutment surface 152.

A lock plate 154 has a lateral through bore 156 formed in the upper right-hand corner (as viewed in FIG. 4) as well as a vertically extending arcuate slot 160 laterally extending therethrough in the middle portion thereof. Lock plate 154 is retained in assembly by a laterally extending guide pin 162 extending through bores 124 (122) of leg member 76 (74) as well as slot 160. A generally triangular lock release crank member 164 formed of injection molded polyprophylene is disposed within cavity 114 and includes a laterally extending through bore 166, 168 and 170 adjacent each corner thereof. Bore 166 is dimensioned for slip-fit receipt of pivot pin 50. Bore 168 fixedly receives the lowermost end of control wire 98, as well as one end of a tension spring 171. The other end of spring 171 is hooked to the end surface 112 of leg member 76. Spring 171 continuously urges crank member 164 toward the position illustrated in FIG. 4. The remaining corner of crank member 164 is loosely disposed within a vertical slot 172 formed in lock plate 154, exiting upwardly and rightwardly therefrom. A guide pin 174 extends laterally through bores 156 of lock plate 154 and bore 170 of crank member 164.

As assembled, crank member 164 is restrained within cavity 114 but is free for rotation about the axis of pivot pin 50 between limits of travel established by the length of slot 160 within lock plate 154. The interconnection between lock plate 154 and crank member 164 as well as the interconnection between link control bracket 144 and link 130 comprise clevis joints.

The left-hand most edge of lock plate 154 is curved and generally convex to define an abutment surface 176 disposed adjacent surface 116 of leg member 76. The lower right-hand corner of lock plate 154 has a concave recess formed therein to define a further abutment surface 178. Abutment surfaces 152 and 178 are substantially complimentary and have nearly constant radiuses whereby when lock plate 154 is in the position illustrated in FIG. 4, a large surface area contact is established therebetween. Furthermore, limited relative rotation between surfaces 152 and 178 is permitted.

As viewed in FIG. 4, lock plate 154 is disposed in the locked or engaged position in which surface 116 abuts surface 176 and surface 152 abuts surface 178, virtually eliminating chucking between the seat back frame 73 and the lower recliner structure 36. In this position, control wire 98 tends to be slack and the spring 171 biasing crank member 164 tends to push lock plate 154 downwardly. Surfaces 176 end 178 are tapered downwardly to create a wedging affect to eliminate any looseness or play that may occur over time due to wear or deformation. In this position, pin 162 is nearly (but still slightly spaced from) the top of slot 160. So positioned, the seat back frame 73 is rigidly connected to the lower recliner structure 36 in both directions of rotation about pin 50. In effect, bracket 144 and lock plate 154 are disposed in parallel between frame 73 and link 130, bracket 144 tensionally resisting rotation in one direction only and link 130 compressively resisting rotation in an opposite direction only. When forces, such as an occupant leaning into the back rest 22, tend to displace seat back frame 73 clockwise about pin 50, the leading external surface of leg member 76 is captured by bracket 144 which, in turn, is restrained by link 130, which, in turn, is restrained by traveling nut 126, which, is restrained by drive screw 62 which is axially restrained by suitable fastening means such as screws 180 associated with motor/gear transmission 66 as well as C-clip 182. The provision of axial and radial support to drive screw 62 at both ends thereof greatly enhances structural integrity of the adjuster as well as allows an approximately 50% reduction in the axial length of drive screw 62 without diminishing the range of motion of the upper structure 34 as contrasted with prior art designs in which the carrier nut is fixed to the upper track member and the drive screw reciprocally axially translates with respect thereto.

Seat back frame 73 as well as upper and lower track members, 20 and 18, respectively, are preferably constructed of a high strength lightweight material such as aluminum alloy. Materials with a yield strength of approximately 50,000 psi such as 2000, 6000 or 7000 series aluminum alloys are preferred. Link control bracket 144, link 130, and traveling nut 126 are also constructed of aluminum alloy. Drive screw 62 and connecting pin 150 are constructed of steel or other suitable material. The illustrated arrangement has been found to meet typical customer provided loading requirements as well as government mandated crash worthiness specifications for both front and rear impact loading. Under rear loading conditions, bracket 144, link 130 and the portion of drive screw 62 intermediate traveling nut 126 and C clip 182 are subjected almost entirely to tensile loading in the present design. When rear impact loading substantially exceed nine to ten thousand inch pounds, the brackets and links will deform reasonably predictably to provide energy absorption as the seat back and occupant rotate rearwardly. As should be apparent upon reading of the specification, selection of material and component geometry can readily provide variation of the acceptable torque limit about pivot pin 50 and energy absorption characteristics of seating system 10.

When subjected to frontal impact or loading, the seat back frame 73 will tend to rotate counterclockwise as indicated by arrow 184 about pivot pin 50. Under such conditions, it is desirable to retain the seat back frame 73 in its pre-impact positional setting and thereby avoid displacement of any of the seat belt anchor members (especially 24) to ensure that belt tensioning remains in effect throughout the crash event. Lap belt 30 anchor members 28 are affixed to pivot supports 42 and 44 by hardened bolts 186 and nuts 188 extending through laterally registering apertures 190 and 192 formed in pivot supports 42 and 44, respectively. Bolt 186 also adds strength to lower recliner structure 36. Upon frontal impact, surface 116 of leg member 76 is thrust rightwardly against surface 176 of lock plate 154. Lock plate 154 is immediately captured in its illustrated position inasmuch as the surface 178 embracingly engages surface 152 of link 130 and cannot be removed from its latched position as long as frontal impact loading on the seat back frame is taking place. Thus, the force moment arm created by an impact is transferred from the seat back frame 73 through lock plate 154, link 130, traveling nut 126 and the portion of drive screw 62 intermediate traveling nut 126 and thrust plate 46. Due to the pivot joints, the lock plate 154, link 130, and drive screw 62 are subjected to substantially pure compressive loading in this case. To the extent they exist, off axis forces are distributed over a large area of surface contact between link 130 and drive screw 62 with negligible effect. The applicant has found a loading tolerance up to 90,000 inch pounds with the present design. Inasmuch as virtually all of the moment arm forces from frontal impact loading are directed axially through the rearmost end of drive screw 62, it is critical that thrust plate 46 be securely retained upon the rear end of upper track member 20.

Under normal operating conditions, to effect a dumping of the upper recliner structure 34 and back rest 22, either handle 86 or 88 is raised as indicated by arrows 100 and 102, respectively, which, in turn, will produce a tension on control wire 98 as indicated by arrow 184 in FIG. 5. Under such conditions and when the seating system 10 is not subject to significant levels of de-acceleration, crank member 164 will freely rotate counterclockwise about pivot pin 50 thereby raising lock plate 154 from its engaged position illustrated in FIG. 4 to its released position wherein guide pin 162 contacts the lowermost end of slot 160. FIG. 5 illustrates the transition of lock plate 154 as it is nearing but has not yet achieved its release position. When in the release position, lock plate 154 is elevated above link 130 and seat back frame 73 is free to be rotated counterclockwise as indicated by arrow 184 to effect dumping of the seat back.

One advantage of the present invention is that the adjuster means 40 has a memory whereby when the seat back frame 73 is returned from its dumped position to its pre-set upright position, it will remember the setting prior to the dumping process, inasmuch as link 130 has not moved. Furthermore, the resetting process will displace the lock plate 154 from its release position back to its engaged position illustrated in FIG. 4 with a sufficient degree of over-travel to ensure that any looseness or lost motion is eliminated.

Figure 7:
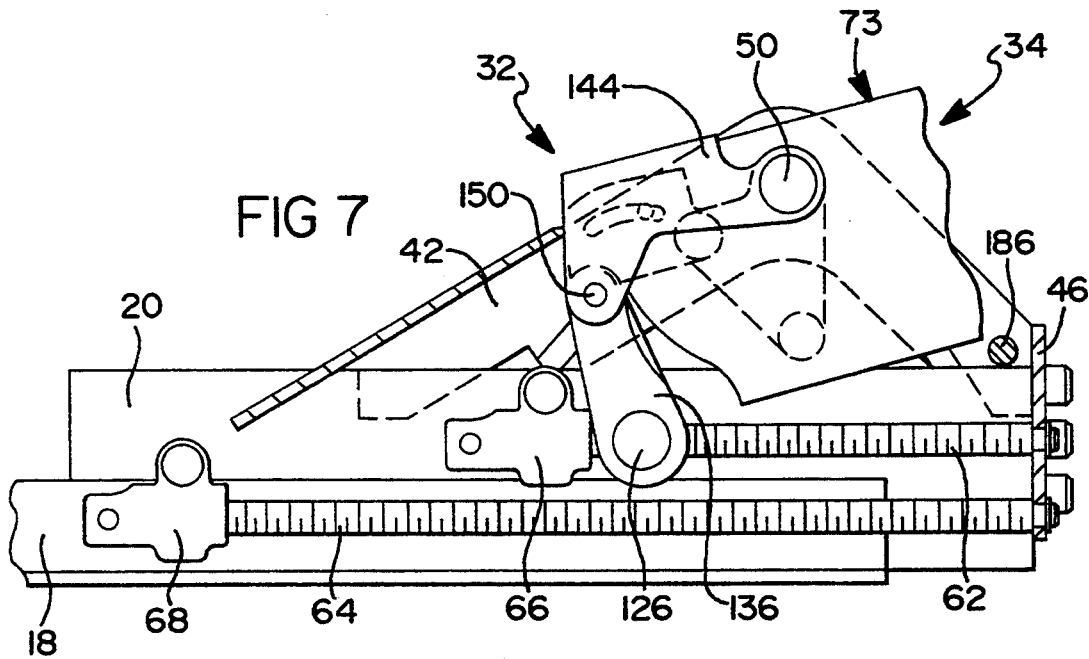
FIG. 7, is the cross-section in partial relief of FIG. 4 with the seat back frame rotated to its fully reclined position.

The seat back frame 73 is illustrated in FIGS. 4 and 5 set in a nominal or design setting intermediate the rotational limits of travel which it may achieve with the present design over approximately 75 degrees between a full upright setting as illustrated in FIG. 6 in a fully reclined position as illustrated in FIG. 7. As motor/gear transmission 66 is selectively energized by the operator, drive screw 62 will rotate in one direction or the other to effect longitudinal translation of traveling nut 126 from its rearward most limit of travel illustrated in FIG. 6 to its forward most limit of travel illustrated in FIG. 7. Nut 126 is prevented from rotation about the axis of drive screw 62 by its engagement with link 130. Stops are established when link 130 contacts thrust surface 56 of thrust plate 46 at one limit of travel and motor/Rear transmission 66 at the other limit of travel. When the seat back frame 73 is in or near its upright most position, link 130 embraces drive screw 62 along its entire length whereby an imaginary line drawn between the axis of traveling nut 126 and pin 150 approximates (approximately 15 degrees offset) becoming parallel to the axis of drive screw 62. This arrangement, in addition to imposing front impact induced forces axially upon drive screw 64, has a further benefit in that the minimum mechanical advantage of the seat back recliner mechanism is achieved when the seat back is in its uppermost position and will be assisted in its operation by both gravity and the forces imposed by an occupant of seat 12. Conversely, when the upper recliner structure 34 is in its fully reclined position as illustrated in FIG. 7, the imaginary line drawn between the axis of traveling nut 126 and connecting pin 150 are generally perpendicular to the axis of drive screw 62 to provide maximum mechanical advantage during early stages of displacement from the illustrated fully reclined position toward the upright position. Restated, a second imaginary line extending between the axes of pivot pin 50 and guide pine 162 will be offset −15 degrees (from vertical) as shown in FIG. 6 and +60 degrees as shown in FIG. 7. These measures are, of course, design specific and will change as modifications are implemented. They are presented here only as an example.

A further advantage of the present design is apparent upon reference to drawing FIG. 2 wherein virtually the entire adjuster mechanism 40 is enclosed either within the upper channel 58 of upper track member 20 or within tubular seat back frame 73 lending for a very clean, compact and easily packaged design.

Referring to FIGS. 13 through 22, the various steps employed in forming the seat back frame 73 are illustrated. Although the complex shape of frame 73 could be drawn in a variable geometry extrusion die or possibly cast to net shape, the preferred approach is to start with a conventionally extruded metal tube as illustrated in FIGS. 13 and 14 having a substantially constant nominal diameter (d) and gauge or wall thickness (t). The extrusion is trimmed to a predetermined length (l) to form a tube blank 194 having open ends 196 and 198 and a middle portion, designated 200, intermediate said ends.

Referring to FIGS. 15 and 16, the next step in the method is to re-extrude or mechanically work tube 194 such as by "double butting", hydraulic reduction or other suitable mechanical process which results in varying the wall thickness (t) to establish a thickness profile along length (l) of tube 194. In the preferred embodiment of the present invention, the wall thickness profile has five distinct regions. In two end regions 202 and 204, wall thickness assumes a maximum value ($t_{max}$) which is constant throughout the region. A middle region 210 generally centered in tube 194 in the middle portion 200 thereof has a wall thickness that assumes a minimum value ($t_{min}$) which is constant throughout. Intermediate end regions 202 and 204 and middle region 210 are two transition regions 206 and 208 in which the characteristic wall thickness (t) tapers from $t_{max}$ to $t_{min}$. Although on the preferred embodiment, tube 194 is symmetrical about its centerline (cl), it is contemplated that in seat frames only employing a single recliner mechanism, an end region and transition region as described hereinabove maybe formed only on one end of tube 194 and the other tube end remains at a $t_{min}$ dimension.

Referring to FIGS. 17 and 18, the next step in the method is that of forming two substantially right angle corners 212, 214 within the middle region 210 of blank 194, whereby the blank assumes a generally inverted U-shape. The bending is preferably accomplished by press or punch bending processes well known in the art.

Referring to FIGS. 19 and 20, the next step in the method involves the forming of blank end regions 202 and 204 into flat sided ellipsoid sections having maximum dimension axes (a—a) which are substantially parallel to one other. By "flat sided," it is meant that a substantial portion of the longitudinally extending sides (s) are sufficiently planar to ensure stabilizing surface contact with pivot supports 42 and 44 (through intermediate link control bracket 144) as is best viewed in FIG. 3.

Referring to FIGS. 21 and 22, a last step involves forming registering pivot pin 50 receiving bores 118 and 120 as well as guide pin 162 receiving bores 122 and 124 as described with reference to the foregoing description with respect to drawing FIGS. 9 and 10. Bores 118 through 124 are formed in end regions 202 and 204. This step also includes the attachment of reinforcement number 80 to facing mounting locations 216 and 218 within end regions 202 and 204. Mounting locations 216 and 218 straddle a characteristic zero load line (zll). Attachment of reinforcement member 80 is accomplished by welding as close as possible to the zero load line or the use of other suitable fasteners. At this time, additional contours are formed in blank 194 to produce seat back frame 73 as described hereinabove. Such deformation includes forming of flattened portion 82, slots 104 and 106, guide holes 91, 93, 95 and 97 as well as the contours of end surfaces 112 as best viewed in FIG. 10.

Reinforcement member 80 is preferably formed of constant gauge high strength aluminum alloy material which is mechanically worked into its illustrated configuration and has a gauge approximately equal to the maximum thickness $t_{max}$ of the end regions 202 and 204 of blank 194.

In carrying out the foregoing forming methodology, it is recognized that various well-known metal working processes may be employed. For example, tube 194 can first be annealed, preferably to an "0" or "W" temper prior to working. Furthermore, age and work hardening of aluminum is also well-known. Shaping of the blank using a mandrel or other similar tube forming techniques is also contemplated. For the sake of brevity, the specifics of such known methodologies is deleted here inasmuch as they are adequately described in numerous treatises.

It is to be understood that the invention has been described with reference to a specific embodiment to provide the features and advantages previously discussed and that the embodiment is susceptible of modification as will be apparent to those skilled in the art. For example, although the present invention is principally intended for application in bucket or split-bench type seats, in the broadest sense, it could be employed in full bench, multi-passenger seats as well. The high strength seat back frame described could also be employed in fixed back type seats and the method steps could be performed in a different order. Accordingly, the foregoing is not to be construed in a limiting sense.

I claim:

1. A seat back frame adapted for mounting to a seat cushion frame for a motor vehicle seat assembly, said seat back frame comprising:
   tubular inboard and outboard vertical leg members; and
   a tubular horizontal base member integrally interconnecting upper portions of said leg members in a generally inverted U-shape configuration, said leg members extending downwardly from said base member and terminating in open end portions adapted for interconnection with said seat cushion frame, said base member and upper portions of said leg members having a characteristic minimum wall thickness and lower portions of said leg members having a characteristic maximum wall thickness which tapers upwardly therealong to said minimum wall thickness.

2. The seat back frame of claim 1, wherein said lower portions each define a region of substantially constant maximum wall thickness.

3. The seat back frame of claim 2, wherein said upper portions are characterized by substantially circular cross-sections and said lower portions are characterized by flat-sided ellipsoid cross-sections having substantially parallel maximum dimension axes.

4. The seat back frame of claim 3, wherein said lower portions define registering pivot apertures.

5. The seat back frame of claim 1, further comprising a generally horizontally extending tubular reinforcement member interconnecting mounting locations defined on said lower portions.

6. The seat back frame of claim 5, wherein said mounting locations longitudinally traverse a characteristic zero load line of each said leg member.

7. The seat back frame of claim 5, further comprising a shoulder restraint anchor member disposed nearly spaced from said upper portion of one of said leg members and interconnected to said reinforcement member through an intermediate, vertically elongate tensile loading member.

8. The seat back frame of claim 7, wherein said loading member is longitudinally resilient and laterally rigid.

9. The seat back frame of claim 1, wherein said base member defines a generally planar seat headrest mounting surface.

10. The seat back frame of claim 1, wherein said vertical leg members and base member are integrally formed from a single piece of tubular metallic material.

11. The seat back frame of claim 10, wherein said single piece of tubular metallic material has a substantially constant outside diameter therealong.

12. The seat back frame of claim 10, wherein said single piece of tubular metallic material comprises monolithic, high strength aluminum alloy.

13. The seat back frame of claim 1, wherein said seat back frame has a generally A-frame profile.

14. A frame for a reclining motor vehicle seat assembly, said frame comprising:
   a lower frame portion for supporting a seat cushion;
   an upper frame portion for supporting a seat back, said upper portion including a generally inverted U-shaped member formed from a single piece of lightweight, high strength metallic tubing having a base and two substantially parallel legs extending from said base and pivotally mounted to said lower frame portion adjacent free open ends thereof, said tube having a characteristic wall thickness which tapers from a maximum dimension adjacent said open ends to a minimum dimension adjacent said base.

15. The frame of claim 14, further comprising adjuster means operative to establish a fixed angular position between said upper and lower frame portions.

16. The frame of claim 15, wherein said adjuster means comprises an actuator carried by said lower frame portion and a linkage system pivotally interconnecting said actuator and upper frame portion.

17. The frame of claim 16, wherein said linkage system includes means operative to selectively disengage said adjuster means from said upper frame portion.

18. The frame of claim 16, wherein at least a portion of said linkage system is disposed within the open ends of said legs.

19. A seat back frame adapted for mounting to a seat cushion frame for a motor vehicle seat assembly, said seat back frame comprising:
   a tube having open ends and an initially substantially constant diameter and wall thickness therealong, said wall thickness mechanically worked to a variable thickness to taper from a maximum dimension to a lesser dimension, said tube bent in at least two locations of lesser wall thickness to form a substantially U-shaped frame configuration.

20. The seat back frame of claim 19, further comprising:
   said wall thickness tapering from a maximum dimension adjacent at least one said end to a lesser dimension intermediate said ends.

21. A seat back frame adapted for mounting to a seat cushion frame for a motor vehicle seat assembly, said seat back frame comprising:
   a tube having open ends and an initially substantially constant diameter and wall thickness therealong, said wall thickness mechanically worked to a variable thickness to taper from a maximum dimension to a lesser dimension, said tube ends formed into flat-sided ellipsoid sections having maximum dimension axes which are substantially parallel.

22. A one-piece vehicle seat back frame comprising:
   a metal tube having open ends and an initially substantially constant diameter and wall thickness therealong, said tube having mechanically worked areas to effect localized changes in said wall thickness to taper from a maximum dimension adjacent at least one said end to a lesser dimension intermediate said ends, said tube bent in at least two locations of lesser wall thickness to form a substantially U-shaped frame configuration and said tube ends deformed into flat-sided ellipsoid sections having maximum dimension axes which are substantially parallel.

23. A one-piece vehicle seat back frame comprising:
an extruded metal tube having a substantially constant diameter and wall thickness therealong, said tube trimmed to a predetermined length, said tube having mechanically worked areas to effect localized changes in said wall thickness to taper from a maximum dimension adjacent at least one said end of said tube to a minimum dimension intermediate said ends, said tube bent in two locations of minimum wall thickness to form two substantially right angle corners whereby said tube assumes a general U-shape and said tube ends deformed into flat-sided ellipsoid sections having maximum dimension axes which are substantially parallel.

* * * * *